(12) United States Patent
Ito

(10) Patent No.: US 9,829,355 B2
(45) Date of Patent: Nov. 28, 2017

(54) METER DEVICE WHICH USES A CENTRAL AND PERIPHERAL LIGHT SOURCE

(71) Applicant: DENSO CORPORATION, Kariya, Aichi-pref. (JP)

(72) Inventor: Hideki Ito, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 341 days.

(21) Appl. No.: 14/443,032

(22) PCT Filed: Oct. 21, 2013

(86) PCT No.: PCT/JP2013/006210
§ 371 (c)(1),
(2) Date: May 14, 2015

(87) PCT Pub. No.: WO2014/076881
PCT Pub. Date: May 22, 2014

(65) Prior Publication Data
US 2017/0227385 A1    Aug. 10, 2017

(30) Foreign Application Priority Data

Nov. 15, 2012 (JP) ................................. 2012-251354

(51) Int. Cl.
*G08B 21/00* (2006.01)
*G01D 13/26* (2006.01)
(Continued)

(52) U.S. Cl.
CPC ........... *G01D 13/265* (2013.01); *B60K 37/02* (2013.01); *G01D 13/28* (2013.01)

(58) Field of Classification Search
CPC .................................................. G01D 13/265
(Continued)

(56) References Cited

U.S. PATENT DOCUMENTS

2002/0108555 A1   8/2002   Breinich et al.
2007/0279243 A1   12/2007  Araki et al.

FOREIGN PATENT DOCUMENTS

JP       H672085 U      10/1994
JP       2002277290 A    9/2002
(Continued)

OTHER PUBLICATIONS

International Search Report and Written Opinion (in Japanese with English Translation) for PCT/JP2013/006210, dated Nov. 12, 2013; ISA/JP.

*Primary Examiner* — Jeffery Hofsass
(74) *Attorney, Agent, or Firm* — Harness, Dickey & Pierce, P.L.C.

(57) ABSTRACT

A meter device includes an instrument panel, a coaxial motor, a central light source, a peripheral light source, and units. The coaxial motor includes rotation shafts which rotate around a single axis perpendicular to the instrument panel. The central light source is disposed near the rotation shafts. The peripheral light source is disposed more distantly from the rotation shafts than the central light source. The units rotate together with the rotation shafts, respectively. The units includes indicator parts, respectively. Each of the indicator parts guides light to emit the light, thereby indicating a surface of the instrument panel. The units include a first unit and a second unit. The first unit includes a light path which guides light from the central light source to the indicator part. The second unit includes a light path which guides light from the peripheral light source to the indicator part, and a non-light guide part that prevents the light of the central light source from being guided to the indicator part.

7 Claims, 3 Drawing Sheets

(51) Int. Cl.
*G01D 13/28* (2006.01)
*B60K 37/02* (2006.01)

(58) Field of Classification Search
USPC ............ 340/438, 449, 450, 451, 455, 815.4, 340/815.42
See application file for complete search history.

(56) References Cited

FOREIGN PATENT DOCUMENTS

| | | | |
|---|---|---|---|
| JP | 2006266874 | A | 10/2006 |
| JP | 2007187529 | A | 7/2007 |
| JP | 2008014931 | A | 1/2008 |
| JP | 2008209341 | A | 9/2008 |
| JP | 2009014623 | A | 1/2009 |
| JP | 4728881 | B2 | 7/2011 |

METER DEVICE WHICH USES A CENTRAL AND PERIPHERAL LIGHT SOURCE

CROSS REFERENCE TO RELATED APPLICATIONS

This application is a U.S. National Phase Application under 35 U.S.C. 371 of International Application No. PCT/JP2013/006210 filed on Oct. 21, 2013 and published in Japanese as WO 2014/076881 A1 on May 22, 2014. This application is based on and claims the benefit of priority from Japanese Patent Application No. 2012-251354 filed on Nov. 15, 2012. The entire disclosures of all of the above applications are incorporated herein by reference.

TECHNICAL FIELD

The present disclosure relates to a meter device that includes at least two coaxial indicators on a surface of one instrument panel for displaying information on a vehicle.

BACKGROUND ART

Conventionally, there is known a meter device that includes at least two coaxial indicators on a surface of one instrument panel. To make the positions of these indicators distinct against the instrument panel surface on which scales and numerals are marked, there is known a technique whereby the indicators are configured by a transparent member that transmits light to guide the light of an LED, for example, thereby making the indicators emit the light (see, for example, Patent Document 1).

According to the technique described in Patent Document 1, a common light source is provided for rotation shafts of the indicators to make indicators arranged one above the other emit light.

PRIOR ART DOCUMENT

Patent Document

Patent Document 1: JP2002-277290A

Given the present circumstances where information presented to a driver, for example, is becoming diversified, there is a demand for display of another information on the instrument panel surface indicated by the indicator. When one instrument panel surface includes different design versions that can switch between patterns of scales, numerals or the like, one version requires two indicators, whereas one indicator is enough for another version, and thus each version may differ in the number of indicators required. In these cases, the indicator emitting light may hinder the display. In the case of a meter device having two indicators, one indicator needs to be controlled to emit light, and the other indicator not to emit light.

However, in the above-described Patent Document 1, because of the common light source that makes the two indicators emit light, the two indicators cannot be made to emit light separately.

SUMMARY OF INVENTION

The present disclosure addresses the above issues. Thus, it is an objective of the present disclosure to enable indicators to emit light separately, in a meter device including at least two coaxial indicators.

A meter device in one aspect of the present disclosure made to achieve the above objective includes an instrument panel, a coaxial motor, a central light source, a peripheral light source, and a plurality of units.

The coaxial motor includes a plurality of rotation shafts which rotate around a single axis perpendicular to the instrument panel. The central light source is disposed near the plurality of rotation shafts. The peripheral light source is disposed at a position more distant from the plurality of rotation shafts than this central light source.

The plurality of units are provided to extend perpendicularly from the plurality of rotation shafts and rotate together with the plurality of rotation shafts, respectively. The plurality of units respectively includes a plurality of indicator parts, each of which guides light to emit the light, thereby indicating a surface of the instrument panel. Particularly, in the present disclosure, the plurality of units include a first unit and a second unit.

The first unit includes a light path which guides light from the central light source to a corresponding one of the plurality of indicator parts. On the other hand, the second unit includes a light path which guides light from the peripheral light source to a corresponding one of the plurality of indicator parts, and a non-light guide part that prevents the light of the central light source from being guided to the corresponding one of the plurality of indicator parts.

Accordingly, the second unit that makes the indicator part emit the light from the peripheral light source is provided separately from the first unit that makes the indicator part emit the light from the central light source. Moreover, the second unit is provided with the non-light guide part for preventing the light of the central light source from being guided to the indicator part. By controlling the central light source and the peripheral light source independently of each other, the indicator part of the first unit and the indicator part of the second unit can emit light separately. As a result, in the meter device including the coaxial indicators, the indicators can emit light separately.

In addition, a configuration including two or more first units, or a configuration including two or more second units may be employed. In the case of the configuration including two or more second units, by providing independently-controllable peripheral light sources corresponding to the second units, the indicator part of one second unit and the indicator part of another second unit can also emit light separately.

The control of such light sources may be carried out by a microcomputer. Accordingly, the microcomputer that can respectively control the central light source and the peripheral light source independently may be further provided.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments will be described below with reference to the drawings.

First Embodiment

Figure 1A:
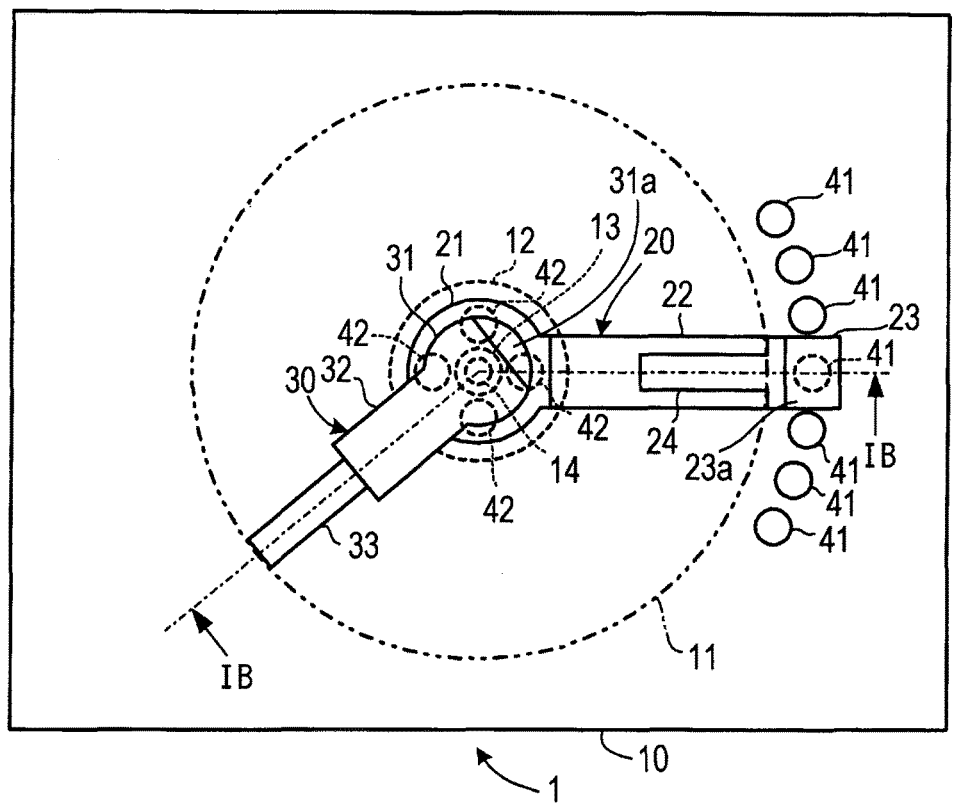
FIG. 1A is a schematic plan view illustrating a meter device in accordance with a first embodiment.
Figure 1B:
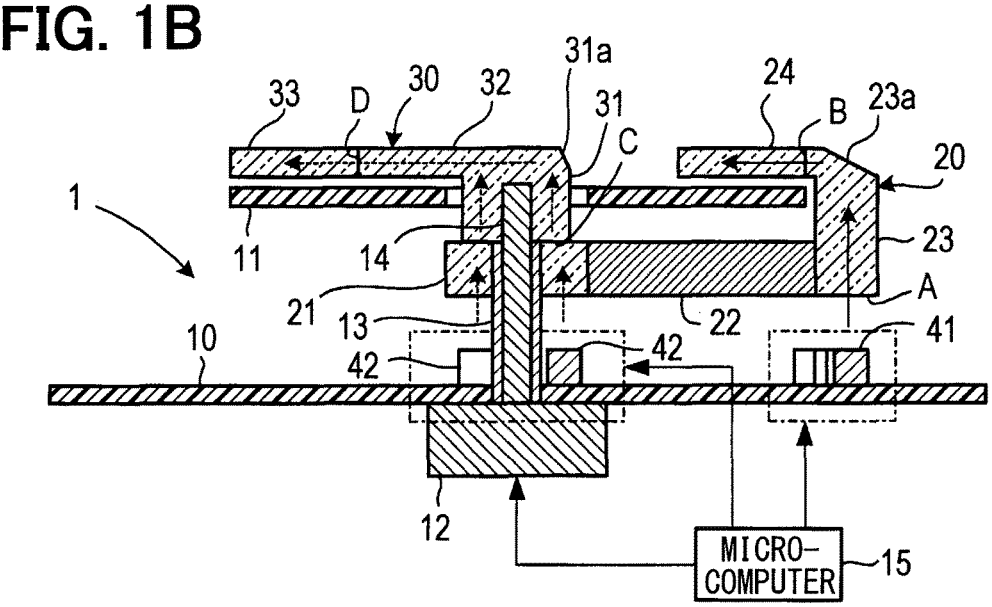
FIG. 1B is a schematic sectional view taken along a line IB-IB in FIG. 1A.

As illustrated in FIGS. 1A and 1B, a meter device 1 is configured on a rectangular board 10. A circular instrument panel 11 is fixed above the board 10 by a screw (not shown) or the like. Scales and numerals are marked on an upper surface of this instrument panel 11.

A coaxial motor 12 is attached on a rear side of the board 10 corresponding to a central part of the instrument panel 11. The coaxial motor 12 includes two coaxial rotation shafts 13, 14, and can rotate these rotation shafts 13, 14 separately. The rotation shafts 13, 14 project toward an upper surface of the board 10 perpendicularly to the board 10. The rotation shafts 13, 14 rotate around the axis line that is perpendicular to the board 10. One rotation shaft 13 has a cylindrical shape. The other rotation shaft 14 is rod-shaped, and projects upward of the rotation shaft 13 through the inside of the rotation shaft 13 having a cylindrical shape. As illustrated in FIG. 1B, the coaxial motor 12 is controlled by a microcomputer 15.

A lower unit (second unit) 20 is attached to the one rotation shaft 13. The lower unit 20 is U-shaped in section to position the instrument panel 11 between upper and lower parts of the lower unit 20, and includes a lower fixing part 21, a lower arm part 22, a light guide part 23, and a first indicator part 24.

The lower fixing part 21 has a cylindrical shape, which is circular in cross-section that is perpendicular to the rotation shafts 13, 14, and is configured by a transparent member. This lower fixing part 21 is press-fitted and fixed to the rotation shaft 13.

The lower arm part 22 is a member having a shape of a rectangular parallelepiped that extends radially outward from the lower fixing part 21 on a lower side of the instrument panel 11. This lower arm part 22 serves as a non-light guide part that does not transmit the light.

The light guide part 23 is formed in a shape of a rectangular parallelepiped similar to the lower arm part 22. The light guide part 23 extends upward perpendicularly from an end portion of the lower arm part 22, and passes outward of an end edge portion of the instrument panel 11 to project toward an upper side of the instrument panel 11. On its upper surface, the light guide part 23 includes a tapered portion 23a that is inclined to the lower side in a radially outward direction.

The first indicator part 24 is a transparent member, and extends radially inward from an upper end portion of the light guide part 23 along an upper surface of the instrument panel 11. As can be seen from FIG. 1A, the first indicator part 24 is the same as approximately half the lower arm part 22 in breadth, and is located radially outward of a generally middle portion of the instrument panel 11.

Because of the above-described configuration, as a result of the rotation of the rotation shaft 13, the lower unit 20 is rotated in the circumferential direction along the outer periphery of the instrument panel 11. An upper unit (first unit) 30 is attached to the other rotation shaft 14. The upper unit 30 includes an upper fixing part 31, an upper arm part 32, and a second indicator part 33.

Similar to the lower fixing part 21, the upper fixing part 31 has a cylindrical shape, which is circular in cross-section that is perpendicular to the rotation shafts, and is configured by a transparent member. This upper fixing part 31 is press-fitted and fixed to the rotation shaft 14. On its upper surface, the upper fixing part 31 includes a tapered portion 31a that is inclined to the lower side in a direction away from the upper arm part 32 which will be hereinafter described.

The upper arm part 32 is a member having a shape of a rectangular parallelepiped that extends radially outward from the upper fixing part 31 on an upper side of the instrument panel 11, and is configured by a transparent member. The second indicator part 33 is a transparent member, and extends outward further from an end portion of the upper arm part 32 in the radial direction of the instrument panel 11. As can be seen from FIG. 1A, this second indicator part 33 is the same as approximately half the upper arm part 32 in breadth, and is located radially outward of a generally middle portion of the instrument panel 11.

Because of the above-described configuration, as a result of the rotation of the rotation shaft 14, the upper unit 30 is rotated in the circumferential direction along the outer periphery of the instrument panel 11. On the upper surface of the board 10, primary light emitting diodes (seven primary light emitting diodes in the present embodiment: hereinafter referred to as primary LEDs) 41 for the first indicator are arranged side by side in an arc-like shape outside of the instrument panel 11 along the outer periphery of the instrument panel 11. This primary LED (peripheral light source) 41 is disposed in a movable range of the lower unit 20, and irradiates the light guide part 23 with light no matter where the rotation position of the lower unit 20 may be. Lighting/extinction of the primary LED 41 can be controlled by the microcomputer 15.

With regard to the above-described lower unit 20, the configuration of the light guide part 23 by a transparent member has been already mentioned. An opposed surface (surface indicated by a sign A in FIG. 1B) to the primary LED 41, and a connected surface (surface indicated by a sign B) to the first indicator part 24 are transparent, and the remaining surfaces are covered with a coating material or cover of black or the like that does not transmit the light.

As a result of the above-described configuration, when the primary LED 41 lights up by the microcomputer 15, as indicated by continuous arrowed lines in FIG. 1B, the light from the primary LED 41 is guided to the first indicator part 24 through the light guide part 23. Accordingly, the first indicator part 24 emits light, so that the position of the first indicator part 24 is clearly shown against the instrument panel 11 on which scales, numerals and the like are marked. For example, the primary LED 41 is a red LED, such that the first indicator part 24 becomes luminous with a red light.

On the upper surface of the board 10, secondary light emitting diodes (four secondary light emitting diodes in the present embodiment: hereinafter referred to as secondary LEDs) 42 for the second indicator are arranged evenly side by side around the rotation shaft 13. This secondary LED (central light source) 42 is located on a lower side of the lower fixing part 21. Lighting/extinction of the secondary LED 42 can also be controlled by the microcomputer 15. The lighting/extinction of the secondary LED 42 is possible separately from the lighting/extinction of the primary LED 41.

With regard to the above-described upper unit 30, the configuration of the upper fixing part 31 and the upper arm part 32 by transparent members has been already mentioned. An opposed surface (surface indicated by a sign C in FIG. 1B) to the lower fixing part 21, and a connected surface (surface indicated by a sign D) to the second indicator part 33 are transparent, and the remaining surfaces are covered with a coating material or cover of black or the like that does not transmit the light.

As a result of the above-described configuration, when the secondary LED 42 lights up by the microcomputer 15, as indicated by short-dashed arrowed lines in FIG. 1B, the light from the secondary LED 42 passes through the lower fixing part 21 to be guided to the second indicator part 33 through the upper fixing part 31 and the upper arm part 32. Accordingly, the second indicator part 33 emits light, so that the position of the second indicator part 33 is clearly shown against the instrument panel 11 on which scales, numerals and the like are marked. For example, the secondary LED 42 is a blue LED, such that the second indicator part 33 becomes luminous with a blue light.

Particularly, in the present embodiment, the lower arm part 22 of the lower unit 20 serves as a non-light guide part, and accordingly the light from the secondary LED 42 is not guided to the light guide part 23 (eventually, to the first indicator part 24) of the lower unit 20. Furthermore, the light from the primary LED 41 is not guided to the upper arm part 32 (eventually, to the second indicator part 33) of the upper unit 30. Thus, when the primary LED 41 lights up and the secondary LED 42 is extinguished by the microcomputer 15, only the first indicator part 24 emits light. When the primary LED 41 is extinguished and the secondary LED 42 lights up, only the second indicator part 33 emits light.

As described in detail above, the meter device 1 of the present embodiment includes the instrument panel 11, the coaxial motor 12, the primary LEDs 41, the secondary LEDs 42, the lower unit 20, and the upper unit 30.

The upper unit 30 includes the upper fixing part 31 and the upper arm part 32 which are formed by transparent members that serve as a light path guiding the light from the secondary LED 42 to the second indicator part 33. On the other hand, the lower unit 20 includes the light guide part 23 that serves as a light path guiding the light from the primary LED 41 to the first indicator part 24. The lower unit 20 includes the lower arm part 22 which is a non-light guide part that prevents the light of the secondary LED 42 from being guided to the first indicator part 24.

Accordingly, by controlling the primary LED 41 and the secondary LED 42 independently of each other, the first indicator part 24 and the second indicator part 33 can emit light separately. In the present embodiment, the primary LED 41 lights up and the secondary LED 42 is extinguished by the microcomputer 15, so that only the first indicator part 24 emits light. Moreover, the primary LED 41 is extinguished and the secondary LED 42 lights up by the microcomputer 15, so that only the second indicator part 33 emits light. Therefore, there is provided the microcomputer 15 that can control the respective light sources of the primary LED 41 and the secondary LED 42 independently of each other. Consequently, the lighting/extinction of the indicator parts 24, 33 can be controlled relatively easily.

In the present embodiment, the lower arm part 22 serves as a non-light guide part, and is provided between the lower fixing part 21 and the light guide part 23. Specifically, at its end portion on an opposite side from the rotation shaft 13, the lower unit 20 includes the light guide part 23 that serves as a light path guiding the light to the first indicator part 24 which is disposed on an upper side of the instrument panel 11 and that extends from the lower side to upper side outward of the end edge portion of the instrument panel 11. The lower arm part 22 which is a non-light guide part is provided between the rotation shaft 13 and the light guide part 23. Accordingly, by a relatively simple configuration, the light from the secondary LED 42 can be prevented from being guided to the light guide part 23 (eventually, to the first indicator part 24).

In the present embodiment, the primary LEDs 41 are arranged one after another in an arc-like shape along the outer periphery of the instrument panel 11 outward of the instrument panel 11, and irradiate the light guide part 23 with light no matter where the rotation position of the lower unit 20 may be. The board 10, which is disposed perpendicular to the rotation shafts 13, 14 is provided on a lower side of the instrument panel 11 and on rear sides of the lower unit 20 and the upper unit 30. The primary LEDs 41 are provided side by side in an arc-like shape on the board 10 to cover the entire movable range of the light guide part 23. Accordingly, the light from the primary LED 41 can be supplied to the first indicator part 24 regardless of the rotation position of the lower unit 20.

In the present embodiment, the secondary LEDs 42 are arranged one after another evenly around the rotation shaft 13. As a consequence, even though the upper unit 30 rotates, approximately the same amount of light can be guided to the second indicator part 33.

Additionally, in the present embodiment, for example, the primary LED 41 is a red LED, and the secondary LED 42 is a blue LED. Thus, the secondary LED 42 and the primary LED 41 have different luminescent colors from each other. Consequently, the first indicator part 24 and the second indicator part 33 can emit light with different colors.

Second Embodiment

The present embodiment is different from the above-described embodiment in structures of the lower unit 20 and the upper unit 30. For this reason, the different parts will mainly be described, and the corresponding reference numeral will be given to the same component, to omit its explanation.

Figure 2A:
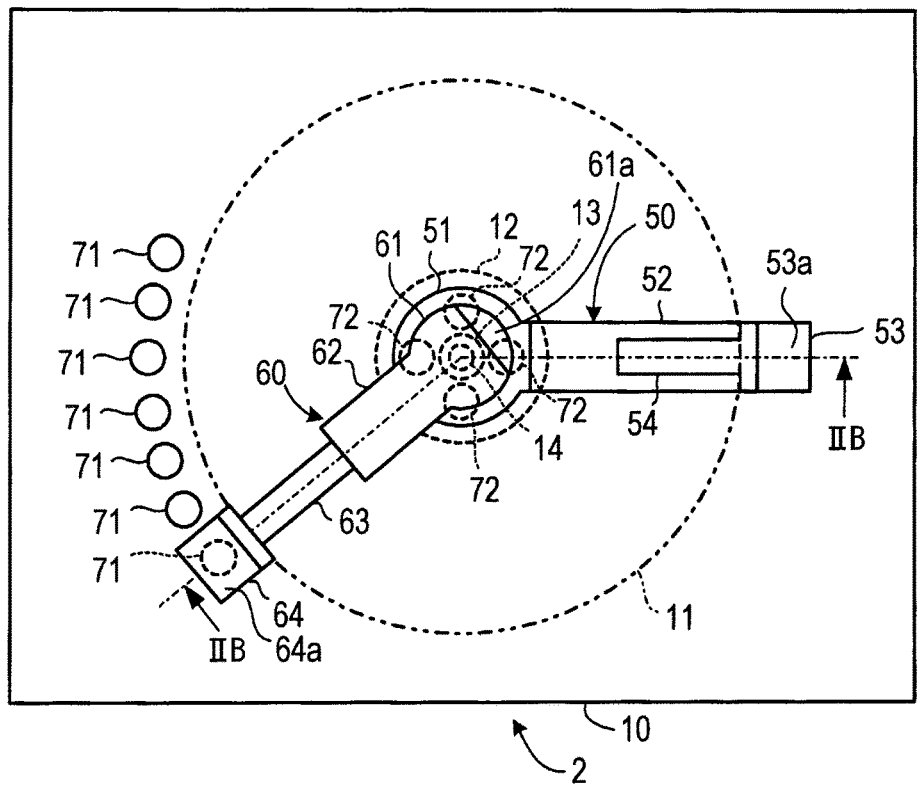
FIG. 2A is a schematic plan view illustrating a meter device in accordance with a second embodiment.
Figure 2B:
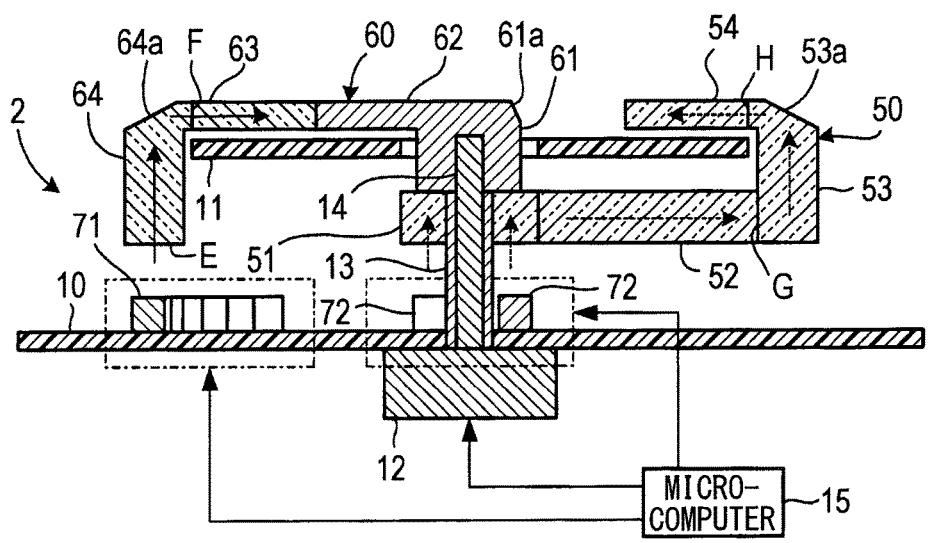
FIG. 2B is a schematic sectional view taken along a line IIB-IIB in FIG. 2A.

As illustrated in FIGS. 2A and 2B, in a meter device 2, a lower unit (first unit) 50 is attached to one rotation shaft 13 of a coaxial motor 12. Similar to the lower unit 20 described above, the lower unit 50 is U-shaped in section to position an instrument panel 11 between upper and lower parts of the lower unit 50, and includes a lower fixing part 51, a lower arm part 52, a connection part 53, and a first indicator part 54.

The lower fixing part 51 has a cylindrical shape, which is circular in cross-section that is perpendicular to the rotation shafts 13, 14, and is configured by a transparent member. This lower fixing part 51 is press-fitted and fixed to the rotation shaft 13.

The lower arm part 52 is a member having a shape of a rectangular parallelepiped that extends radially outward from the lower fixing part 51 on a lower side of the instrument panel 11. This lower arm part 52 is different from the lower arm part 22 of the above-described embodiment in that the lower arm part 52 is configured by a transparent member that transmits the light.

The connection part 53 is formed in a shape of a rectangular parallelepiped similar to the lower arm part 52. The connection part 53 extends upward perpendicularly from an end portion of the lower arm part 52, and passes outward of an end edge portion of the instrument panel 11 to project toward an upper side of the instrument panel 11. On its upper surface, the connection part 53 includes a tapered portion 53a that is inclined to the lower side in a radially outward direction.

The first indicator part 54 is a transparent member, and extends radially inward from an upper end portion of the connection part 53 along an upper surface of the instrument panel 11. As can be seen from FIG. 2A, the first indicator part 54 is the same as approximately half the lower arm part 52 in breadth, and is located radially outward of a generally middle portion of the instrument panel 11.

Because of the above-described configuration, as a result of the rotation of the rotation shaft 13, the lower unit 50 is rotated in the circumferential direction along the outer periphery of the instrument panel 11. An upper unit (second unit) 60 is attached to the other rotation shaft 14. The upper unit 60 includes an upper fixing part 61, an upper arm part 62, a second indicator part 63, and a light guide part 64.

Similar to the lower fixing part 51, the upper fixing part 61 has a cylindrical shape, which is circular in cross-section that is perpendicular to the rotation shafts. This upper fixing part 61 is press-fitted and fixed to the rotation shaft 14. On its upper surface, the upper fixing part 61 includes a tapered portion 61a that is inclined to the lower side in a direction away from the upper arm part 62 which will be hereinafter described.

The upper arm part 62 is a member having a shape of a rectangular parallelepiped that extends radially outward from the upper fixing part 61 on an upper side of the instrument panel 11. The present embodiment differs from the upper fixing part 31 and the upper arm part 32 in the above-described embodiment in that the upper fixing part 61 and the upper arm part 62 serve as a non-light guide part that does not transmit the light.

The second indicator part 63 is a transparent member, and extends outward further from an end portion of the upper arm part 62 in the radial direction of the instrument panel 11. As can be seen from FIG. 2A, this second indicator part 63 is the same as approximately half the upper arm part 62 in breadth, and is located radially outward of a generally middle portion of the instrument panel 11.

Because of the above-described configuration, as a result of the rotation of the rotation shaft 14, the upper unit 60 is rotated in the circumferential direction along the outer periphery of the instrument panel 11. The light guide part 64 has a similar structure to the connection part 53 of the lower unit 50, and is formed in a shape of a rectangular parallelepiped. The light guide part 64 extends downward perpendicularly from an end portion of the second indicator part 63, and passes outward of an end edge portion of the instrument panel 11 to project toward a lower side of the instrument panel 11. On its upper surface, the light guide part 64 includes a tapered portion 64a that is inclined to the lower side in a radially outward direction.

On an upper surface of a board 10, primary light emitting diodes (seven primary light emitting diodes in the present embodiment: hereinafter referred to as primary LEDs) 71 for the second indicator are arranged side by side in an arc-like shape outside of the instrument panel 11 along the outer periphery of the instrument panel 11. This primary LED (peripheral light source) 71 is disposed in a movable range of the upper unit 60, and irradiates the light guide part 64 with light no matter where the rotation position of the upper unit 60 may be. Lighting/extinction of the primary LED 71 can be controlled by a microcomputer 15.

With regard to the above-described upper unit 60, the configuration of the light guide part 64 by a transparent member has been already mentioned. An opposed surface (surface indicated by a sign E in FIG. 2B) to the primary LED 71, and a connected surface (surface indicated by a sign F) to the second indicator part 63 are transparent, and the remaining surfaces are covered with a coating material or cover of black or the like that does not transmit the light.

As a result of the above-described configuration, when the primary LED 71 lights up by the microcomputer 15, as indicated by continuous arrowed lines in FIG. 2B, the light from the primary LED 71 is guided to the second indicator part 63 through the light guide part 64. Accordingly, the second indicator part 63 emits light, so that the position of the second indicator part 63 is clearly shown against the instrument panel 11 on which scales, numerals and the like are marked. For example, the primary LED 71 is a blue LED, such that the second indicator part 63 becomes luminous with a blue light.

On the upper surface of the board 10, secondary light emitting diodes (four secondary light emitting diodes in the present embodiment: hereinafter referred to as secondary LEDs) 72 for the first indicator are arranged evenly around the rotation shaft 13. This secondary LED (central light source) 72 is located on a lower side of the lower fixing part 51. Lighting/extinction of the secondary LED 72 can also be controlled by the microcomputer 15. The lighting/extinction of the secondary LED 72 is possible separately from the lighting/extinction of the primary LED 71.

With regard to the above-described lower unit 50, the configuration of the connection part 53 by a transparent member has been already mentioned. A connected surface (surface indicated by a sign G in FIG. 2B) to the lower arm part 52, and a connected surface (surface indicated by a sign H) to the first indicator part 54 are transparent, and the remaining surfaces are covered with a coating material or cover of black or the like that does not transmit the light.

As a result of the above-described configuration, when the secondary LED 72 lights up by the microcomputer 15, as indicated by short-dashed arrowed lines in FIG. 2B, the light from the secondary LED 72 is guided to the first indicator part 54 through the lower fixing part 51, the lower arm part 52, and the connection part 53. Accordingly, the first indicator part 54 emits light, so that the position of the first indicator part 54 is clearly shown against the instrument panel 11 on which scales, numerals and the like are marked. For example, the secondary LED 72 is a red LED, such that the first indicator part 54 becomes luminous with a red light.

Particularly, in the present embodiment, the upper fixing part 61 and the upper arm part 62 of the upper unit 60 serve as non-light guide parts, and accordingly the light from the secondary LED 72 is not guided to the second indicator part 63 of the upper unit 60. Furthermore, the light from the primary LED 71 is not guided to the lower fixing part 51 (eventually, to the first indicator part 54) of the lower unit 50. Thus, when the primary LED 71 lights up and the secondary LED 72 is extinguished by the microcomputer 15, only the second indicator part 63 emits light. When the primary LED 71 is extinguished and the secondary LED 72 lights up, only the first indicator part 54 emits light.

As described in detail above, the meter device 2 of the present embodiment includes the instrument panel 11, the coaxial motor 12, the primary LEDs 71, the secondary LEDs 72, the lower unit 50, and the upper unit 60.

The lower unit 50 includes the lower fixing part 51, the lower arm part 52, and the connection part 53 which are formed by transparent members that serve as a light path guiding the light from the secondary LED 72 to the first indicator part 54. On the other hand, the upper unit 60 includes the light guide part 64 that serves as a light path guiding the light from the primary LED 71 to the second indicator part 63. The upper unit 60 includes the upper fixing part 61 and the upper arm part 62 which are non-light guide parts that prevent the light of the secondary LED 72 from being guided to the second indicator part 63.

Accordingly, by controlling the primary LED 71 and the secondary LED 72 independently of each other, the first indicator part 54 and the second indicator part 63 can emit light separately. In the present embodiment, the primary LED 71 lights up and the secondary LED 72 is extinguished by the microcomputer 15, so that only the second indicator part 63 emits light. Moreover, the primary LED 71 is extinguished and the secondary LED 72 lights up by the microcomputer 15, so that only the first indicator part 54 emits light. Therefore, there is provided the microcomputer 15 that can control the respective light sources of the primary LED 71 and the secondary LED 72 independently of each other. Consequently, the lighting/extinction of the indicator parts 54, 63 can be controlled relatively easily.

In the present embodiment, the upper fixing part 61 and the upper arm part 62 serve as non-light guide parts, and are provided between the lower fixing part 51 and the light guide part 64. Specifically, at its end portion on an opposite side from the rotation shaft 14, the upper unit 60 includes the light guide part 64 that serves as a light path guiding the light to the second indicator part 63 which is disposed on an upper side of the instrument panel 11 and that extends from the lower side to upper side outward of the end edge portion of the instrument panel 11. The upper fixing part 61 and the upper arm part 62 which is a non-light guide part is provided between the rotation shaft 14 and the light guide part 64. Accordingly, by a relatively simple configuration, the light from the secondary LED 72 can be prevented from being guided to the second indicator part 63.

In the present embodiment, the primary LEDs 71 are arranged one after another in an arc-like shape along the outer periphery of the instrument panel 11 outward of the instrument panel 11, and irradiate the light guide part 64 with light no matter where the rotation position of the upper unit 60 may be. The board 10 which is disposed perpendicular to the rotation shafts 13, 14 is disposed on a lower side of the instrument panel 11 and on rear sides of the lower unit 50 and the upper unit 60. The primary LEDs 71 are provided side by side in an arc-like shape on the board 10 to cover the entire movable range of the light guide part 64. Accordingly, the light from the primary LED 71 can be supplied to the second indicator part 63 regardless of the rotation position of the upper unit 60.

In the present embodiment, the secondary LEDs 72 are arranged one after another evenly around the rotation shaft 13. As a consequence, even though the lower unit 50 rotates, approximately the same amount of light can be guided to the first indicator part 54.

Additionally, in the present embodiment, for example, the primary LED 71 is a blue LED, and the secondary LED 72 is a red LED. Thus, the primary LED 71 and the secondary LED 72 have different luminescent colors from each other. Consequently, the first indicator part 54 and the second indicator part 63 can emit light with different colors.

The present disclosure is not at all limited to the above-described embodiments, and can be brought into practice in various modes without departing from its technical scope.

Figure 3A:
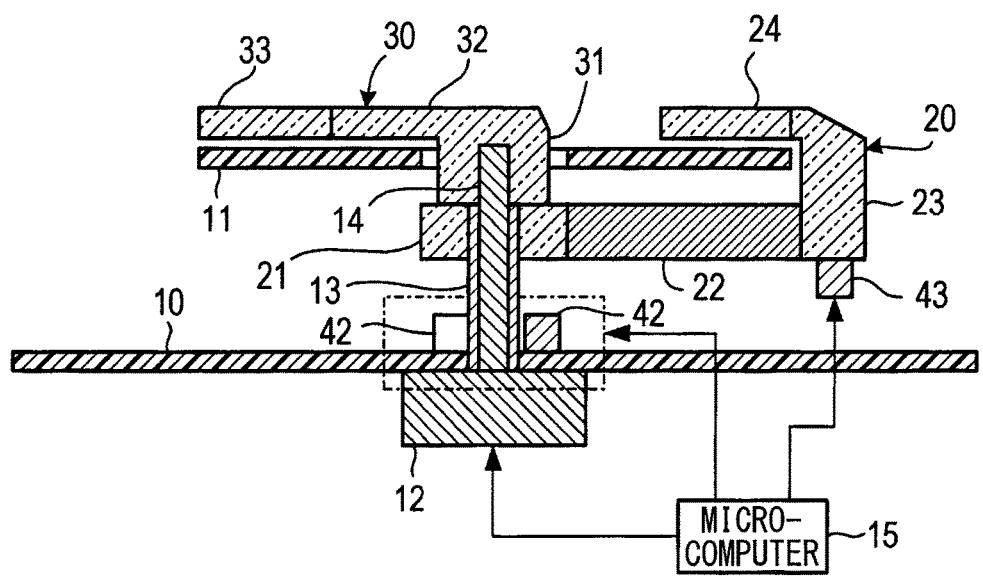
FIG. 3A is a schematic sectional view illustrating a modification to the meter device of the first embodiment.

(i) In the above first embodiment, the primary LEDs 41 are arranged one after another in an arc-like shape on the board 10 (see FIG. 1A). Alternatively, as illustrated in FIG. 3A, a primary LED (peripheral light source) 43 may be disposed on a lower part of the light guide part 23 of the lower unit 20. Accordingly, the primary LED 43 is provided for the light guide part 23 to be movable together with the light guide part 23. As a result, the number of LEDs can be made smaller such as one. Furthermore, the LEDs do not need to be arranged in accordance with the movable range of the lower unit 20.

Figure 3B:
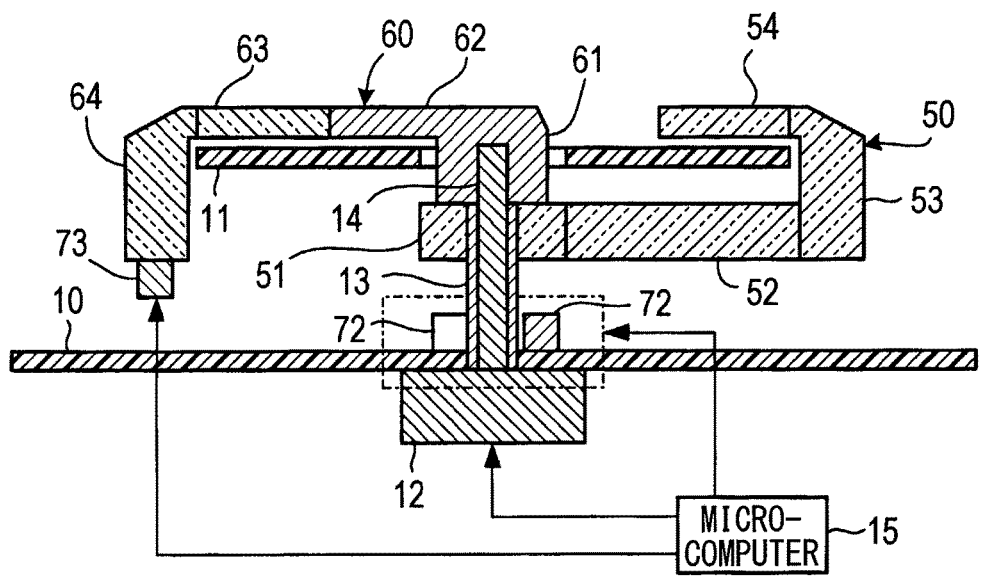
FIG. 3B is a schematic sectional view illustrating a modification to the meter device of the second embodiment.

(ii) Similarly, in the above second embodiment, the primary LEDs 71 are arranged side by side in an arc-like shape on the board 10 (see FIG. 2A). Alternatively, as illustrated in FIG. 3B, a primary LED (peripheral light source) 73 may be disposed on a lower part of the light guide part 64 of the upper unit 60. Accordingly, the primary LED 73 is provided for the light guide part 64 to be movable together with the light guide part 64. As a result, the number of LEDs can be made smaller such as one. Furthermore, the LEDs do not need to be arranged in accordance with the movable range of the upper unit 60.

(iii) In both the above-described embodiments, the lighting/extinction of the primary LEDs 41, 71 and the secondary LEDs 42, 72 is controlled by the microcomputer 15. In a lighted state, the control may be performed such that brightness differs between the primary LEDs 41, 71 and the secondary LEDs 42, 72.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A meter device comprising:
  an instrument panel;
  a coaxial motor that includes a plurality of rotation shafts which rotate around a single axis perpendicular to the instrument panel;
  a central light source that is disposed near the plurality of rotation shafts;
  a peripheral light source that is disposed at a position more distant from the plurality of rotation shafts than the central light source; and
  a plurality of units that are provided to extend perpendicularly from the plurality of rotation shafts and rotate together with the plurality of rotation shafts, respectively, wherein:
  the plurality of units includes a plurality of indicator parts, respectively, each of the plurality of indicator parts guiding light to emit the light, thereby indicating a surface of the instrument panel; and
  the plurality of units include:
  a first unit that includes a light path which guides light from the central light source to a corresponding one of the plurality of indicator parts; and
  a second unit that includes:
    a light path which guides light from the peripheral light source to a corresponding one of the plurality of indicator parts; and
    a non-light guide part that prevents the light of the central light source from being guided to the corresponding one of the plurality of indicator parts.

2. The meter device according to claim 1, further comprising a microcomputer that is capable of controlling the central light source and the peripheral light source independently of each other.

3. The meter device according to claim 1, wherein:
at an end portion of the second unit on its opposite side from the plurality of rotation shafts, the second unit includes a light guide part that is configured as a light path which guides the light to the corresponding one of the plurality of indicator parts disposed on an upper surface side of the instrument panel and that extends from a lower surface side to the upper surface side of the instrument panel outward of an end edge portion of the instrument panel; and
the non-light guide part is provided between the plurality of rotation shafts and the light guide part.

4. The meter device according to claim 3, further comprising a board that is disposed perpendicular to the plurality of rotation shafts on the lower surface side of the instrument panel and on rear sides of the plurality of units, wherein the peripheral light source is one of a plurality of peripheral light sources that are provided side by side in an arc-like shape on the board to cover an entire movable range of the light guide part.

5. The meter device according to claim 3, wherein the peripheral light source is provided for the light guide part to be movable together with the light guide part.

6. The meter device according to claim 1, wherein the central light source is one of a plurality of central light sources that are arranged side by side evenly around the plurality of rotation shafts.

7. The meter device according to claim 1, wherein the central light source and the peripheral light source have different luminescent colors from each other.

\* \* \* \* \*